(12) United States Patent
Newton et al.

(10) Patent No.: US 11,349,912 B2
(45) Date of Patent: May 31, 2022

(54) CROSS-CLUSTER DIRECT SERVER RETURN IN A CONTENT DELIVERY NETWORK (CDN)

(71) Applicant: Level 3 Communications, LLC, Broomfield, CO (US)

(72) Inventors: Christopher Newton, Westlake Village, CA (US); Laurence R. Lipstone, Calabasas, CA (US); Hong Zhu, Moorpark, CA (US)

(73) Assignee: Level 3 Communications, LLC, Broomfield, CA (US)

( * ) Notice: Subject to any disclaimer, the term of this patent is extended or adjusted under 35 U.S.C. 154(b) by 381 days.

(21) Appl. No.: 15/364,036

(22) Filed: Nov. 29, 2016

(65) Prior Publication Data

US 2018/0152510 A1    May 31, 2018

(51) Int. Cl.
| | |
|---|---|
| *H04L 67/1036* | (2022.01) |
| *H04L 67/1021* | (2022.01) |
| *H04L 67/1014* | (2022.01) |
| *H04L 67/1008* | (2022.01) |
| *H04L 61/4511* | (2022.01) |
| *H04L 61/4535* | (2022.01) |
| *H04L 67/02*   | (2022.01) |
| *H04L 67/141*  | (2022.01) |

(52) U.S. Cl.
CPC ...... *H04L 67/1036* (2013.01); *H04L 61/1511* (2013.01); *H04L 61/1535* (2013.01); *H04L 67/02* (2013.01); *H04L 67/1008* (2013.01); *H04L 67/1014* (2013.01); *H04L 67/1021* (2013.01); *H04L 67/141* (2013.01)

(58) Field of Classification Search
CPC ............ H04L 61/1511; H04L 67/1021; H04L 61/1535; H04L 65/4084; H04L 67/42; H04L 47/70; H04L 67/1008; H04L 67/1014; G06F 2209/463
See application file for complete search history.

(56) References Cited

U.S. PATENT DOCUMENTS

| | | | |
|---|---|---|---|
| 6,711,632 B1 * | 3/2004 | Chow ................. | G06F 12/0804 709/237 |
| 6,813,635 B1 | 11/2004 | Jorgenson | |
| 7,447,775 B1 * | 11/2008 | Zhu .................. | H04N 21/23439 709/217 |
| 7,792,982 B2 * | 9/2010 | Padmanabhan ....... | H04L 67/104 709/231 |

(Continued)

OTHER PUBLICATIONS

International Search Report dated Apr. 10, 2017, Int'l Appl. No. PCT/US17/014758, Int'l Filing Date Jan. 24, 2017; 3 pgs.

(Continued)

*Primary Examiner* — Hitesh Patel (57) ABSTRACT

A computer-implemented method, operable on a device in a content delivery network (CDN), wherein the CDN delivers content on behalf of at least one content provider, the device implementing a content delivery (CD) service, the method includes receiving a request from a client for particular content; determining a second device in the CDN, the first device being in a first cluster and the second device being in a second cluster distinct from the first cluster; migrating the request to the second device; and then providing the second device with network traffic from the client.

2 Claims, 7 Drawing Sheets

(56) References Cited

U.S. PATENT DOCUMENTS

| | | | | |
|---|---|---|---|---|
| 7,797,426 B1* | 9/2010 | Lyon | .................. | H04L 67/1008 709/219 |
| 9,549,368 B2* | 1/2017 | Jover Segura | .......... | H04L 67/18 |
| 2007/0127515 A1* | 6/2007 | Ben-Arie | ................ | H04L 12/42 370/429 |
| 2009/0276842 A1* | 11/2009 | Yevmenkin | ......... | H04L 67/1002 726/13 |
| 2011/0093610 A1* | 4/2011 | Rezaiifar | .................. | H04L 1/08 709/232 |
| 2011/0208706 A1 | 8/2011 | Rangarajan | | |
| 2011/0295943 A1* | 12/2011 | Peuziat | ............... | H04L 65/1069 709/203 |
| 2011/0320819 A1* | 12/2011 | Weber | ................... | H04L 9/3215 713/176 |
| 2013/0041970 A1* | 2/2013 | Pinto | .................. | G06F 16/9574 709/213 |
| 2013/0204961 A1* | 8/2013 | Fliam | ................. | H04L 67/1097 709/214 |
| 2013/0232249 A1* | 9/2013 | Weihl | ...................... | G06F 9/505 709/223 |
| 2014/0172970 A1* | 6/2014 | Newton | .............. | H04L 41/0893 709/204 |
| 2014/0280747 A1* | 9/2014 | Johns | ..................... | H04L 47/70 709/219 |
| 2015/0237159 A1* | 8/2015 | Lawrence | .......... | H04L 67/2814 709/213 |
| 2016/0119279 A1* | 4/2016 | Maslak | .............. | H04L 61/1511 709/223 |
| 2016/0191455 A1* | 6/2016 | Newton | .................. | G06F 16/48 709/245 |

OTHER PUBLICATIONS

Written Opinion of the International Searching Authority dated Apr. 10, 2017, Int'l Appl. No. PCT/US17/014758, Int'l Filing Date Jan. 24, 2017; 6 pgs.

European Examination Report, dated Sep. 21, 2020, Application No. 17877314.9, filed Jan. 24, 2027; 12 pp.

Contavalli, C. et al., "Client Subnet in DNS Queries", Internet Engineering Task Force, IETF; Standard, Internet Society (ISOC); rfc7871.txt; XP015112866 [retrieved on May 20, 2016], pp. 1-30.

Gao, Yanping et al., "New Architecture and Algorithm for Webserver Cluster based on Linux Virtual Server", Information Processing (ISIP), 2008 International Symposiums on, IEEE, Piscataway, NJ, May 23, 2008; XP031279472; ISBN: 978-0-7695-3151-9, pp. 520-524.

International Preliminary Report on Patentability, dated Jun. 4, 2019, Int'l Appl. No. PCT/US17/014758, Int'l Filing Date Jan. 24, 2017; 8 pgs.

European Examination Report, dated Aug. 19, 2021, Application No. 17877314.9, filed Jan. 24, 2017; 8 pgs.

Jiao, Yang et al., "Design and Implementation of Load Balancing of Distributed-system-based Web Server", Electronic Commerce and Security (ISECS), 2010 Third International Symposium on Electronic and Security, IEEE Jul. 29, 2010, pp. 337-342.

\* cited by examiner

CROSS-CLUSTER DIRECT SERVER RETURN IN A CONTENT DELIVERY NETWORK (CDN)

BACKGROUND OF THE INVENTION

Copyright Statement

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to content delivery and content delivery networks. More specifically, this invention relates to cross-cluster direct server return in content delivery networks.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Glossary

As used herein, unless used otherwise, the following terms or abbreviations have the following meanings:

AS means autonomous system;
CD means content delivery;
CDN means content delivery network;
DNS means domain name system;
DSR means direct server return;
HTTP means Hyper Text Transfer Protocol;
HTML means Hypertext Markup Language;
HTTPS means HTTP Secure;
OSI model refers to the Open Systems Interconnection model;
SSL means Secure Sockets Layer;
URI means Uniform Resource Identifier; and
URL means Uniform Resource Locator.

A "mechanism" refers to any device(s), process(es), routine(s), service(s), module(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

Description

A content delivery network (CDN) distributes content (e.g., resources) efficiently to clients on behalf of one or more content providers, preferably via a public Internet. Content providers provide their content (e.g., resources) via origin sources (origin servers or origins). A CDN can also provide an over-the-top transport mechanism for efficiently sending content in the reverse direction—from a client to an origin server. Both end-users (clients) and content providers benefit from using a CDN. Using a CDN, a content provider is able to take pressure off (and thereby reduce the load on) its own servers (e.g., its origin servers). Clients benefit by being able to obtain content with fewer delays.

Figure 1:
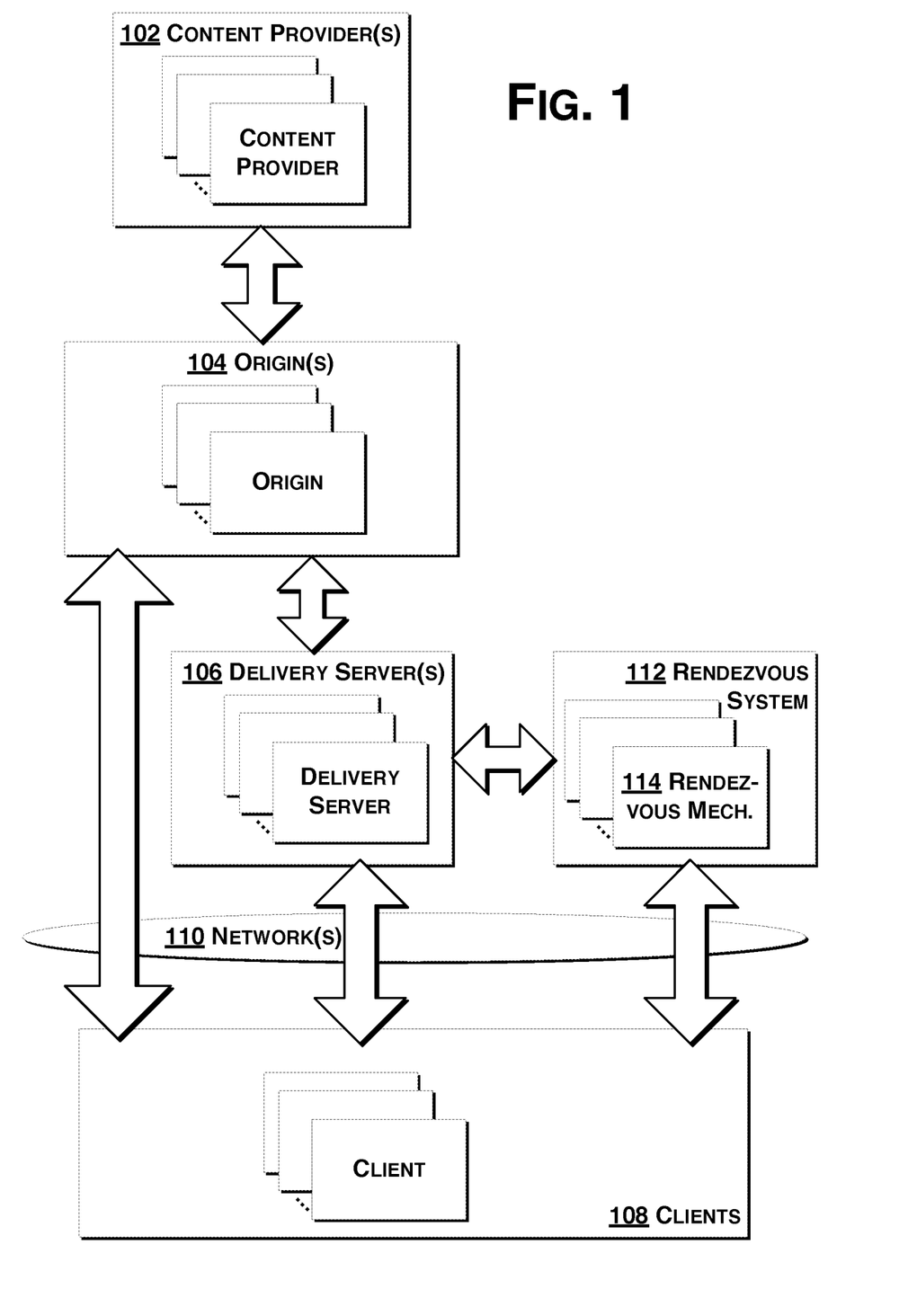
FIG. 1 depicts aspects of a content delivery network (CDN) according to exemplary embodiments hereof.

FIG. 1 shows aspects of an exemplary CDN in which one or more content providers 102 provide content via one or more origin sources 104 and delivery services (servers) 106 to clients 108 via one or more networks 110. The delivery services (servers) 106 may form a delivery network from which clients 108 may obtain content. The delivery services 106 may be logically and/or physically organized hierarchically and may include edge caches. The delivery services 106 may be logically and/or physically organized as clusters and super-clusters, as described below.

As should be appreciated, components of a CDN (e.g., delivery servers or the like) may use the CDN to deliver content to other CDN components. Thus a CDN component may itself be a client of the CDN. For example, the CDN may use its own infrastructure to deliver CDN content (e.g., CDN control and configuration information) to CDN components.

Client requests (e.g., for content) may be associated with delivery server(s) 106 by a rendezvous system 112 comprising rendezvous mechanism(s) 114, possibly in the form of one or more rendezvous networks. The rendezvous mechanism(s) 114 may be implemented, at least in part, using or as part of a DNS system, and the association of a particular client request (e.g., for content) with one or more delivery servers may be done as part of DNS processing associated with that particular client request (e.g., of a domain name associated with the particular client request).

As should be appreciated, typically, multiple delivery servers 106 in the CDN can process or handle any particular client request for content (e.g., for one or more resources). Preferably the rendezvous system 112 associates a particular client request with one or more "best" or "optimal" (or "least worst") delivery servers 106 to deal with that particular request. The "best" or "optimal" delivery server(s) 106 may be one(s) that is (are) close to the client (by some measure of network cost) and that is (are) not overloaded. Preferably the chosen delivery server(s) 106 (i.e., the delivery server(s) chosen by the rendezvous system 112 for a client request) can deliver the requested content to the client or can direct the client, somehow and in some manner, to somewhere where the client can try to obtain the requested content. A chosen delivery server 106 need not have the requested content at the time the request is made, even if that chosen delivery server 106 eventually serves the requested content to the requesting client.

When a client 108 makes a request for content, the client may be referred to as the requesting client, and the delivery server 106 that the rendezvous system 112 associates with that client request (and that the client first contacts to make the request) may be referred to as the "initial contact" (IC) server or just the initial contact.

Exemplary CDNs are described in U.S. Pat. Nos. 8,060,613 and 8,825,830, the entire contents of both of which have been fully incorporated herein by reference for all purposes.

Clusters and Clustering

As designated intermediaries for given origin service, a CDN generally provides a redundant set of service endpoints running on distinct hardware in different locations. These distinctly addressed but functionally equivalent service endpoints provide options to the rendezvous system 112. Each distinct endpoint is preferably, but not necessarily, uniquely addressable within the system, preferably using an addressing scheme that may be used to establish a connection with the endpoint. The address(es) of an endpoint may be real or virtual. In some implementations, e.g., where service endpoints (preferably functionally equivalent service endpoints) are bound to the same cluster and share a virtual address, the virtual address may be used.

In the case of an IP-based system, each distinct endpoint may be defined by at least one unique IP address and port number combination. In an IP-based system where service endpoints are logically bound to the same cluster and share an IP address, each distinct endpoint may be defined by at least one unique combination of the IP address and port number. In some cases, service endpoints that are logically bound to the same cluster may share a so-called VIP (virtual IP address), in which cases each distinct endpoint may be defined by at least one unique combination of the VIP and a port number. In the latter case, each distinct endpoint may be bound to exactly one physical cluster in the CDN.

It should be appreciated that not all service types will require or have multi-agent logical clusters. In such cases, the endpoint may be defined in terms of a real address rather than a virtual address (e.g., an IP address rather than a VIP). A virtual address may, in some cases, correspond to or be a physical address. For example, a VIP may be (or correspond to) a physical address (e.g., for a single machine cluster).

The term VIP is used in this description as an example of a virtual address (for an IP-based system). In general any kind of virtual addressing scheme may be used and is contemplated herein. Unless specifically stated otherwise, the term VIP is intended as an example of a virtual address, and the system is not limited to or by IP-based systems or systems with IP addresses and/or VIPs.

It should be appreciated that, as used herein, e.g., to describe endpoints in a cluster, the term "functionally equivalent" does not require identical service endpoints. For example, two caching endpoint services may have different capabilities yet may be considered to be functionally equivalent.

Figure 2A:
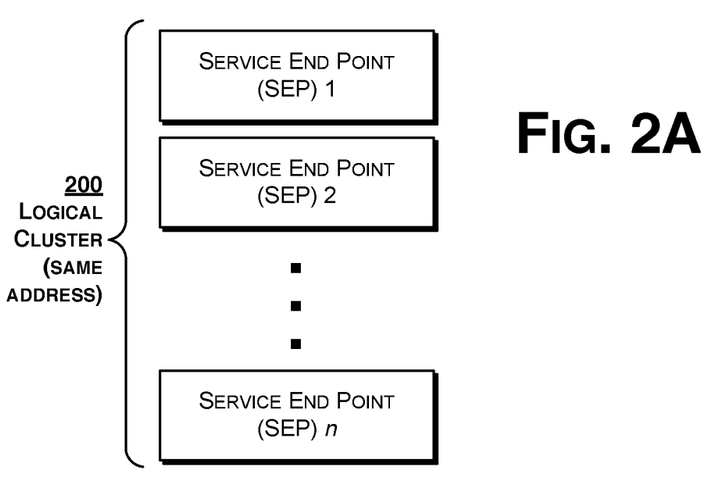
FIGS. 2A and 2B depict aspects of clusters of service endpoints in an exemplary CDN in accordance with exemplary embodiments hereof.

A shown, e.g., in FIG. 2A, service endpoints SEP 1, SEP 2 . . . SEP n are logically bound to the same cluster 200 and share an address. When a logical cluster is within a physical cluster (e.g., when the services are on machines behind a switch), the shared address may be a virtual address (e.g., a VIP).

Figure 2B:
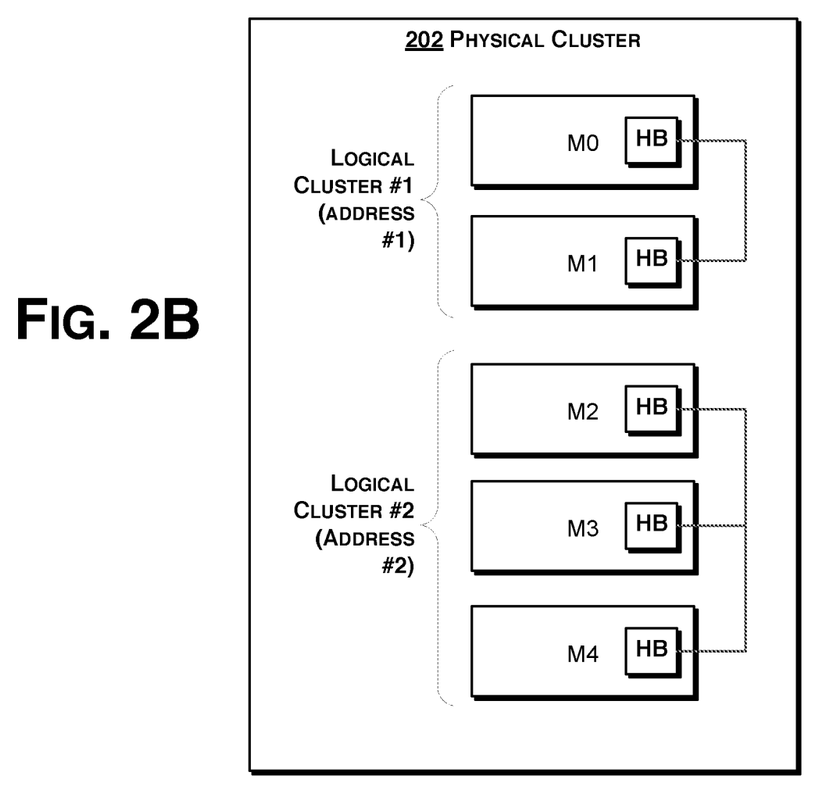

A physical cluster of service endpoints may have one or more logical clusters of service endpoints. For example, as shown in FIG. 2B, a physical cluster 202 includes two logical clusters (Logical Cluster 1 and Logical Cluster 2). Logical Cluster 1 consists of two machines (M0, M1), and Logical Cluster 2 consists of three machines (M2, M3, M4). The machines in each logical cluster may share a heartbeat signal (HB) with other machines in the same logical cluster. In this example, the first logical cluster may be addressable by a first unique virtual address (address #1, e.g., a first VIP/port combination), whereas the second logical cluster may be addressable by a second unique virtual address (address #2, e.g., a second VIP/port combination).

In a typical case, a machine may only be part of a single logical cluster; although it should be appreciated that this is not a requirement.

The machines that share a heartbeat signal may be said to be on a heartbeat ring. In the example cluster shown in FIG. 2B, machines M0 and M1 are on the same heartbeat ring, and machines M2, M3, and M4 are on the same heartbeat ring.

When a service endpoint is bound to a cluster, it means that a bank of equivalent services are running on all the machines in the cluster and listening for service requests addressed to that cluster endpoint address. Preferably a local mechanism (e.g., a load-balancing mechanism) ensures that exactly one service instance (e.g., machine) in the cluster will respond to each unique service request. This may be accomplished, e.g., by consistently hashing attributes of each request to exactly one of the available machines (and of course it is impossible to have more than one service instance listening per machine on the same endpoint). Each service instance running on machines in the cluster can be listening to any number of other endpoint addresses, each of which will have corresponding service instances running on all other machines in the cluster. Those of ordinary skill in the art will realize and understand, upon reading this description, that various mechanisms may be used to allocate/distribute service requests to service instances in a cluster. It should be appreciated that not all types of services need use the same allocation/distribution mechanisms, and that not all clusters of the same kind of service need use the same allocation/distribution mechanisms.

In some preferred implementations, each machine is installed in a physical cluster of machines behind a single shared switch. One physical cluster may be divided up into multiple logical clusters, where each logical cluster consists of those machines on the same physical cluster that are part of the same HB ring. That is, each machine runs an HB process with knowledge of the other machines in the same logical cluster, monitoring all virtual addresses (e.g., VIPs) and updating the local firewall and NIC (network interface card/controller) configurations in order to implement local load balancing across the cluster.

U.S. Pat. No. 8,015,298 titled "Load-Balancing Cluster," (the entire contents of which are fully incorporated herein by reference for all purposes) describes various approaches to ensure that exactly one service instance in a cluster will respond to each unique service request. In a first allocation approach, service endpoints on the same HB ring select from among themselves to process service requests. In a second allocation approach, also for service endpoints on the same HB ring, having selected a service endpoint from among themselves to process service requests, the selected service endpoint may select another service endpoint (preferably from service endpoints on the same HB ring) to actually process the service request. This handoff may be made based on, e.g., the type of request or actual content requested.

Since, in some cases, each machine may be considered to be a peer of all other machines in the cluster, there is no need for any other active entity specific to the cluster.

A subcluster is a group of one or more (preferably homogenous) machines sharing an internal, local area network (LAN) address space, possibly load-balanced, each running a group of one or more collaborating service instances. To external clients, i.e., those not connected to the internal LAN of the subcluster, the collection of service instances is addressed as a single service image, meaning that individual externally visible physical addresses can be used to communicate with all machines in the subcluster, though usually one at a time.

Service instances within the subcluster's internal LAN address space can preferably address each other with internal or external LAN addresses, and may also have the ability to transfer connections from one machine to another in the midst of a single session with an external client, without the knowledge or participation of the client.

A supercluster is a group of one or more (preferably homogenous) subclusters, each consisting of a group of one or more collaborating but distinctly addressed service images. Different service images in the same supercluster may or may not share a common internal LAN (although it should be appreciated that they still have to be able to communicate, directly or indirectly, with each other over some network). Those connected to the same internal LAN may use internal LAN addresses or external LAN addresses, whereas others must use external network addresses to communicate with machines in other subclusters.

Clusters may be interconnected in arbitrary topologies to form subnetworks. The set of subnetworks a service participates in, and the topology of those networks, may be dynamic, constrained by dynamically changing control policies based on dynamically changing information collected from the network itself, and measured by the set of currently active communication links between services.

Figure 3:
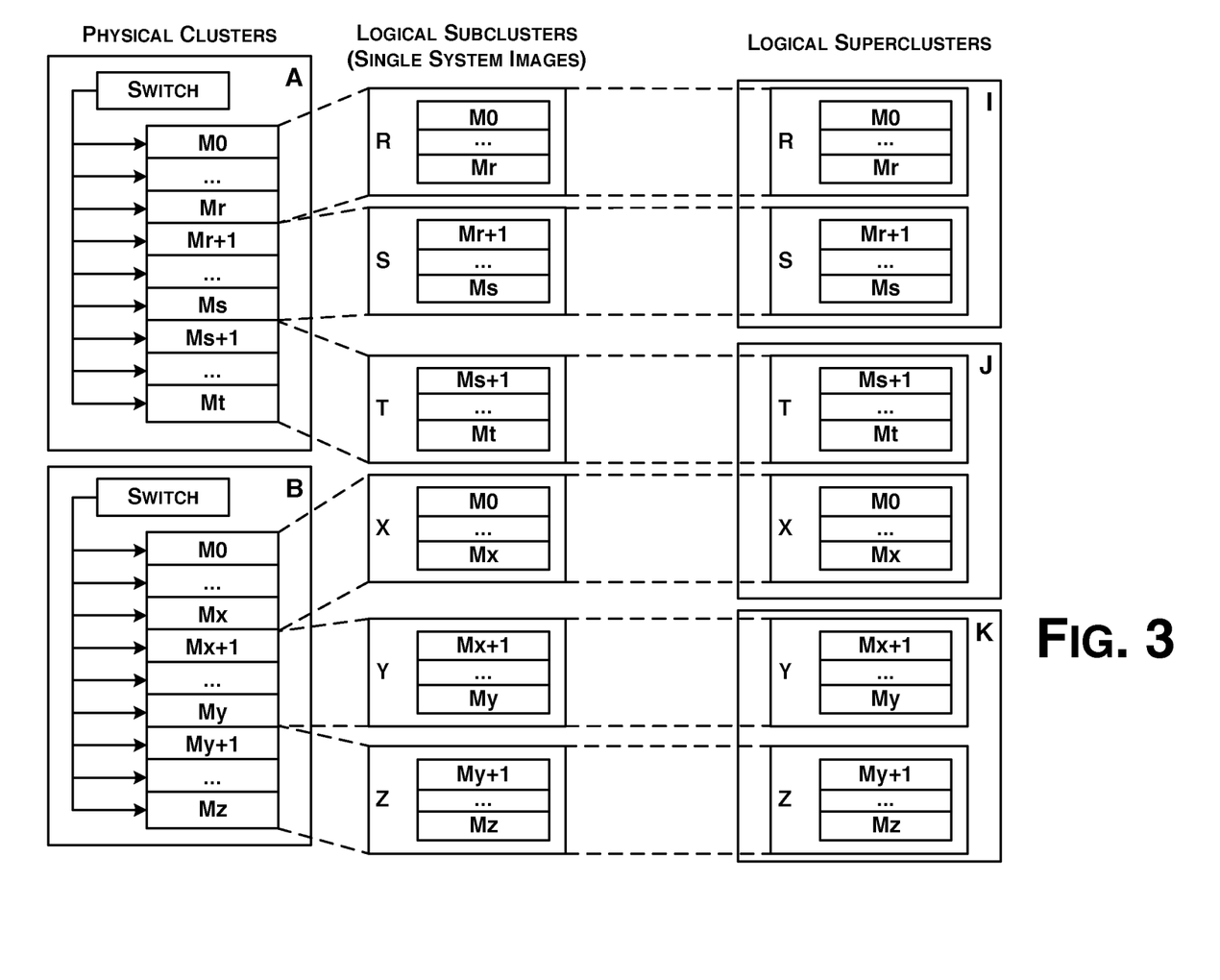
FIG. 3 depicts aspects of clustering in an exemplary CDN in accordance with exemplary embodiments hereof.

An example showing the distinction between physical clusters, logical subclusters, and logical superclusters is shown in FIG. 3. In this example, the machines of two physical clusters A and B are subdivided into groups forming logical subclusters R, S, and T (from the machines of physical cluster A) and logical subclusters X, Y, and Z (from the machines of physical cluster B). These subclusters are then logically recombined to form logical superclusters I (from subclusters R and S), J (from subclusters T and X), and K (from subclusters Y and Z). The number of machines that may be combined into one subcluster is limited by the number of machines in a physical cluster, but theoretically any number of logical subclusters may be grouped into one supercluster that may span multiple physical clusters or be contained within one.

Peering and Topology

Peering is a general term referring to collaboration between different service instances, service images, subclusters, and super-clusters of the same service type in some larger sub-network in order to achieve some effect, typically to improve performance or availability of the service. Though the effect may be observable by the client, the peers involved and the nature of their collaboration need not be apparent to the client.

Typically peering occurs between two or more services of the same rank in a larger sub-network, but may also be used to refer to services of similar rank in some neighborhood of the larger sub-network, especially when the notion of rank is not well defined (as in networks with a cyclic or lattice topology). Parenting is a special case of peering where a parent/child relationship is defined between services.

Note that the formation of logical clusters from physical elements is distinct from the formation of larger subnetworks of service instances running on the machines in a cluster. Service specific subnetworks comprised of interacting service instances may span multiple superclusters, which means the superclusters on which those service instances are running may be considered as forming a network (typically a lattice or hierarchy).

Clustering Assumptions

For some preferred implementations, a two-level cluster architecture is assumed, where machines behind a common switch are grouped into logical sub-clusters, and sub-clusters (whether behind the same switch or on different racks/switches) are grouped into super-clusters. In some preferred implementations, using, e.g., the systems described in U.S. Pat. No. 8,015,298 titled "Load-Balancing Cluster," all machines in a logical sub-cluster are homogeneous with respect to the virtual address (e.g., VIPs) they serve (each machine serves the same virtual addresses—VIPs—as all other machines in the sub-cluster), and machines in distinct logical clusters will necessarily serve distinct (non-overlapping) sets of virtual addresses—VIPs.

A single switch may govern multiple sub-clusters and these sub-clusters need not be in the same super-cluster. It is logically possible to have any number of machines in one sub-cluster, and any number of sub-clusters in a super-cluster, though those of ordinary skill in the art will realize and understand that physical and practical realities will dictate otherwise.

Other features described in U.S. Pat. No. 8,015,298 could be made available as an optional feature of sub-clusters, enabling the transfer of connections from one machine to another in the same sub-cluster.

U.S. Pat. No. 8,015,298 describes various approaches to ensure that exactly one service instance in a cluster will respond to each unique service request. These may be referred to as the first allocation approach and the second allocation approach. In the first allocation approach, service endpoints on the same HB ring select from among themselves to process service requests. In the second allocation approach, also for service endpoints on the same HB ring, having selected a service endpoint from among themselves to process service requests, the selected service endpoint may select another service endpoint (preferably from service endpoints on the same HB ring) to actually process the service request. This handoff may be made based on, e.g., the type of request or actual content requested.

It is assumed here that for some implementations an additional level of heartbeat-like functionality (referred to herein as super-HB) exists at the level of virtual addresses (e.g., VIPs) in a super-cluster, detecting virtual addresses that are down and configuring them on machines that are up. This super-HB allows the system to avoid relying solely on DNS-based rendezvous for fault-tolerance and to deal with the DNS-TTL phenomenon that would cause clients with stale IP addresses to continue to contact VIPs that are known to be down. It should be appreciated that a super-HB system may have to interact with the underlying network routing mechanism (simply bringing a VIP "up" does not mean that requests will be routed to it properly). For example, if a sub-cluster is to take over another sub-cluster's VIP because the second sub-cluster is completely down or has lost enough capacity that the system will consider it to be down, the routing infrastructure is preferably informed that the VIP has moved to a different switch. As noted earlier, while this discussion is made with reference to VIPs, it should be appreciated that the system is not limited to an IP-based scheme, and any type of addressing and/or virtual addressing may be used.

Heartbeat(s) provide a way for machines (or service endpoints) in the same cluster (logical and/or physical and/or super) to know the state of other machines (or service endpoints) in the cluster, and heartbeat(s) provide information to the various allocation techniques. A heartbeat and super-heartbeat may be implemented, e.g., using the reducer/collector systems such as described in U.S. Pat. No. 8,825,830. However, those of ordinary skill in the art will realize and understand, upon reading this description, that a local heartbeat in a physical cluster is preferably implemented locally and with a fine granularity. A super-heartbeat may not have (or need) the granularity of a local heartbeat.

This leads to two extreme approaches to configuring a super-cluster, one relying on the first allocation approach described above (with reference to U.S. Pat. No. 8,015,298), with optional super-HB, the other with super-HB and optional first allocation approach:
- A super-cluster containing N>1 sub-clusters with >1 machines
  First allocation approach required, second allocation approach optional. A super-HB is unnecessary.
- A super-cluster containing N>1 sub-clusters with 1 machine each
  First allocation approach not required, second allocation approach not supported. This requires a super-HB.

Depending on the overhead of the first allocation approach and the fail-over properties of virtual address (e.g., VIP) reconfiguration and rendezvous, it may be advantageous to actually configure a super-cluster somewhere in between these two extremes. On the one hand, the first allocation approach system described in U.S. Pat. No. 8,015,298 provides the most responsive failover at the cost of higher communication overhead. This overhead determines an effective maximum number of machines and VIPs in a single logical sub-cluster based on the limitations of the heartbeat protocol. The First allocation approach mechanisms described in U.S. Pat. No. 8,015,298 also imposes additional overhead beyond that of heartbeat due to the need to broadcast and filter request traffic. On the other hand, a VIP-level failover mechanism that spans the super-cluster would impose similar heartbeat overhead but would not require any request traffic broadcasting or filtering.

Detection of down VIPs in the cluster may potentially be handled without a heartbeat, using a reduction of log events received outside the cluster. A feedback control mechanism could detect inactive VIPs and reallocate them across the cluster by causing new VIP configurations to be generated as local control resources.

Request-Response Processing

As described above, a particular client request for content (e.g., for a resource) uses the rendezvous system 112 to determine an appropriate delivery server 106 to handle the request. That appropriate delivery server 106 effectively becomes the initial contact (IC) server for that request.

Even though, at the time of the request, the rendezvous system 112 considered the initial contact server to be the "best" server for that particular client request, for various reasons, there may be a better choice to provide the requested content to the client. The rendezvous system 112 selects the initial contact server using information known to the rendezvous system at the time of the request. However, that information may be incomplete or inaccurate. For example, the rendezvous decision may be based on a location of the requesting client (based, e.g., on the requesting client's network address, e.g., its IP address), but the rendezvous system may not have accurate location information for the requesting client. Instead, the rendezvous system may only have network location information of the requesting client's network service provide or ISP.

Alternatively, the rendezvous system may be dealing with relatively stale information, so that the IC server may have been best for a particular request when the request was resolved by the rendezvous system, but is no longer so (e.g., the IC server may have become overloaded since the request was resolved by the rendezvous system).

Content associated with or provided by a particular content provider may be referred to as a property. A property may be, e.g., a website and related content, and typically comprises multiple resources. A CDN may provide one or more properties associated with and/or on behalf of one or more content providers. A content provider may have more than one property, and thus a CDN may serve/provide one or more properties associated with and/or on behalf of a particular content provider.

In some cases, some servers may be preferred for certain properties, although this information may not be known to the rendezvous system 112, or the rendezvous system 112 may not know which property is being requested when it selects the initial contact.

Cross-Cluster Direct Server Return

When it is determined that there is a server that is "better" than the initial contact server (IC) server for a particular client request, the IC server may transfer the request to the "better" server (BS). If the "better" server (BS) is in a different cluster than the IC server, the IC may transfer the request to the "better" server using direct server return (DSR). The "better" server(s) may be a server that is determined, (e.g., by some measure of network cost) to be better suited to serve the client request than the "best" server that was selected by the rendezvous system 112. Thus, the "better" server is considered to be better than the initial contact (IC) for this particular request.

As should be understood, the rendezvous system 112 may not have had sufficient information to select the better server (BS).

Figure 4:
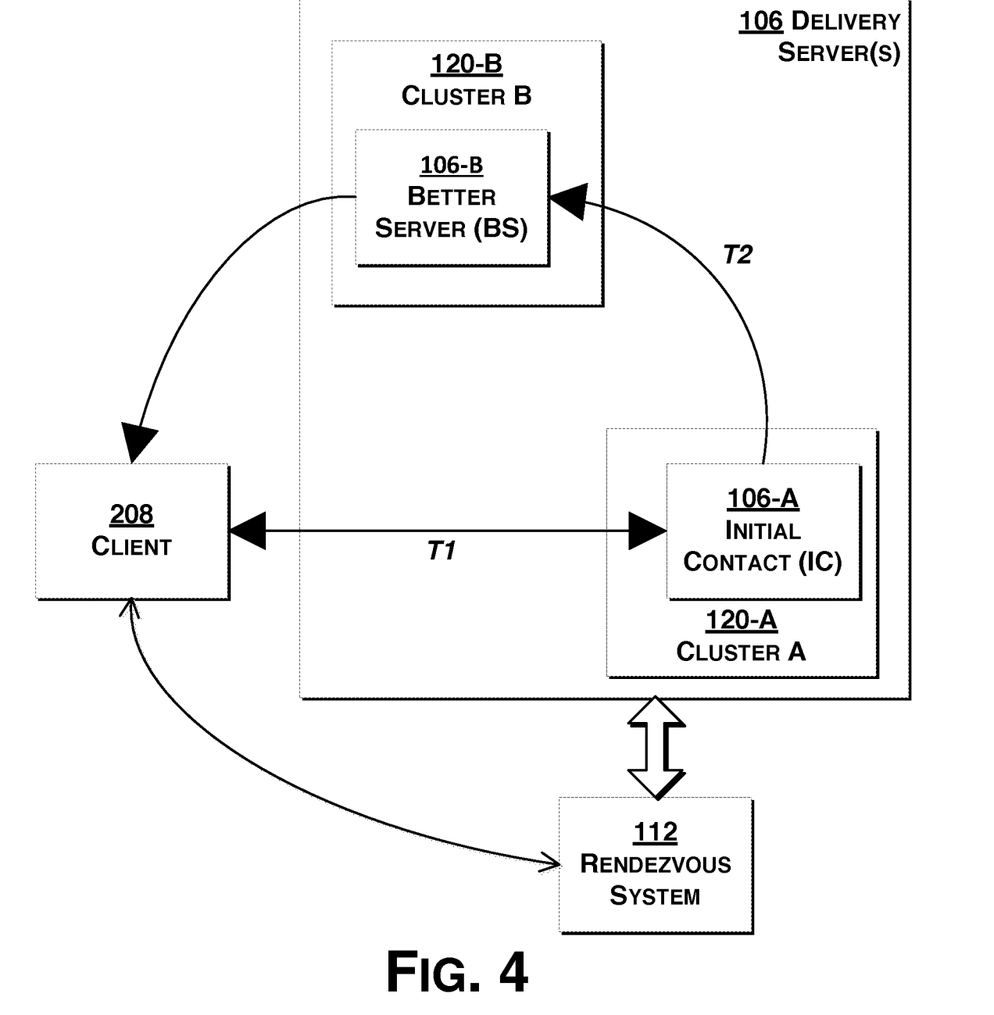
FIGS. 4-5 depict aspects of cross-cluster Direct Server Return in a CDN according to exemplary embodiments hereof.
Figure 5:
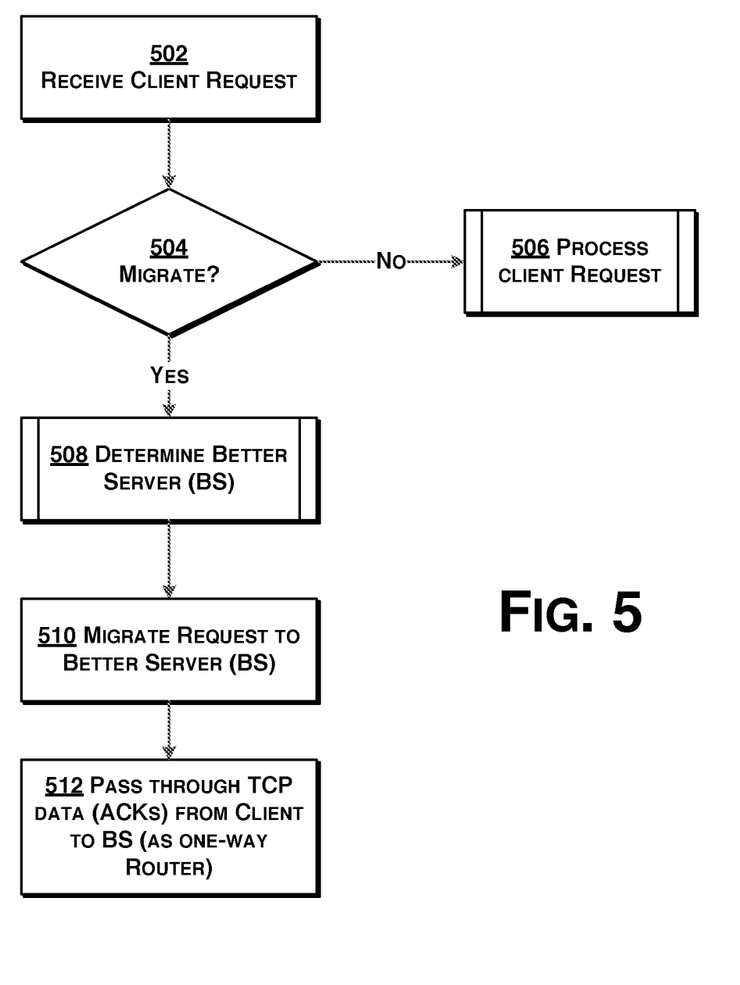

With reference to FIGS. 4 and 5, the client request for content (e.g., one or more resources) is initially directed to initial contact (IC) server(s) 106. This initial association of the client request with the IC may be made, e.g., by the rendezvous system 112. For example, the request may be an HTTP request in the form of a URL (having a corresponding hostname). The client's resolver uses the rendezvous system 112 to resolve the hostname associated with the request and is thereby directed to (or given a network address associated with) the initial contact (IC) 106-A.

The initial contact (IC) 106-A receives the client's request (at 502) and ascertains whether the request is to be migrated and handled by another ("better") server (at 504). If not, the IC handles the client's request itself (at 506).

If the request is to be migrated (as determined at 504), then the IC determines (or causes another entity to determine) the "better" server (BS 106-B) (at 508).

It should be appreciated that the decision as to whether to migrate and the selection of the "better" server (acts 504 and 506) may be combined in a single step.

When it is determined that another server (e.g., "better" server—BS 106-B) is better suited or more appropriate than IC 106-A to handle this client request, the initial contact server (IC) 106-A transfers or migrates the request to the "better" server (BS) 106-B (at 510). In the example shown in FIG. 4, the IC is in a first cluster (cluster A 120-A), whereas the better server BS 106-B is in a second cluster (cluster B, 120-B), distinct from the first cluster.

Cluster A 120-A may be a single machine or a multi-machine cluster, as may cluster B 120-B. In some presently preferred implementations, cluster A 120-A is a single machine cluster at the edge of the CDN, responsible for a particular property.

When cluster B 120-B is a multi-machine cluster, the DSR migrated request (from IC) may be handled by BS 106-B or by any machine in cluster B 120-B, in accordance with that cluster's request processing policies and protocols. The network address that IC uses for BS 106-B may be a VIP for the cluster 120-B or a VIP for BS 106-B or an IP address of BS 106-B. When the address is a VIP for the cluster 120-B, then the cluster may choose BS 106-B to handle the request.

As shown in FIG. 4, when BS 106-B is in a different cluster from IC 106-A, the IC 106-A may transfer the request to BS 106-B using direct server return.

After IC hands off the request to BS, the IC essentially acts as a router for that request (at 512 in FIG. 5). While the handoff (from IC to BS) is transparent to the client, in TCP/IP communication with the BS, the client must get the same IP address as IC. Therefore the BS must spoof the IP address of the IC on a per connection basis (unless the BS has the same public IP address as the IC, e.g., in an anycast system).

The Open Systems Interconnection model (OSI model) is a conceptual model that characterizes and standardizes the communication functions of a telecommunication or computing system without regard to their underlying internal structure and technology. The OSI model partitions a communication system into abstraction layers. The original version of the model defined seven layers, including:

Layer 3 (Network layer—packets) Structuring and managing a multi-node network, including addressing, routing and traffic control (e.g., AppleTalk, ICMP, IPsec, IPv4, IPv6)

Layer 4 (Transport layer) Segments (e.g. TCP)/Datagrams (e.g., UDP)

Layer 5 (Session layer—Data): Managing communication sessions, i.e. continuous exchange of information in the form of multiple back-and-forth transmissions between two nodes (e.g., HTTP, HTTPS)

After the initial client request to the IC 106-A (at Layer 5, the HTTP level), the IC becomes a Layer 3/4 pass-through router in only one direction (from the client to the IC to the BS) for that client request. Thus the IC changes from a Layer 5 session/application layer (e.g. HTTP) server and becomes a Layer 3/4 router. The initial contact is thereby converted into a routing device for that particular client connection. In the case of an HTTPS request/connection, the IC/BS may not be able to communicate sufficient state to have the SSL handshake performed by the IC (so that the request could be inspected by the IC) and then have the BS continue the encryption of the responses. In such cases, the IC may perform a BS selection based on just load and/or client location and then forward the connection immediately that the connection has been established. That is, in such cases, the IC may function as a Layer 3/4 pass-through immediately on connection establishment.

The client 208 establishes a connection (e.g., a TCP/IP connection) with the IC and makes a request (e.g., an HTTP request) to the IC 106-A. The IC 106-A migrates the TCP connection to the BS 106-B. (The IC 106-A freezes the connection with the client and determines the required TCP state information (e.g., sequence numbers, etc.), and conveys that information to the BS 106-B over some protocol (e.g., TCP), preferably over a side-channel, possibly using tunneling. The BS 106-B then constructs the socket and starts sending the packets back (to the client 208).

Every time the client 208 sends an ACK (for the pieces of the TCP packet stream that it receives from the BS 106-B), that ACK is still going to come back to the IC 106-A. The IC 106-A then provides those ACKs to the BS 106-B.

Thus, IC 106-A starts at layer 5 (HTTP) with its connections with the client. Once the handoff is made to BS 106-B, IC 106-A effectively becomes a layer 3/4 (router) and forwards layer 3/4 information (e.g., ACKs) from the client to the BS 106-B. The IC 106-A will still receive the layer 3/4 and layer 5 information (e.g., HTTP) from the client 208, but this information is forwarded to the BS 106-B. Note that the IC 106-A may examine layer 3/4 and layer 5 information, e.g., for tracking purposes or the like, but is not required to do so.

Figure 6:
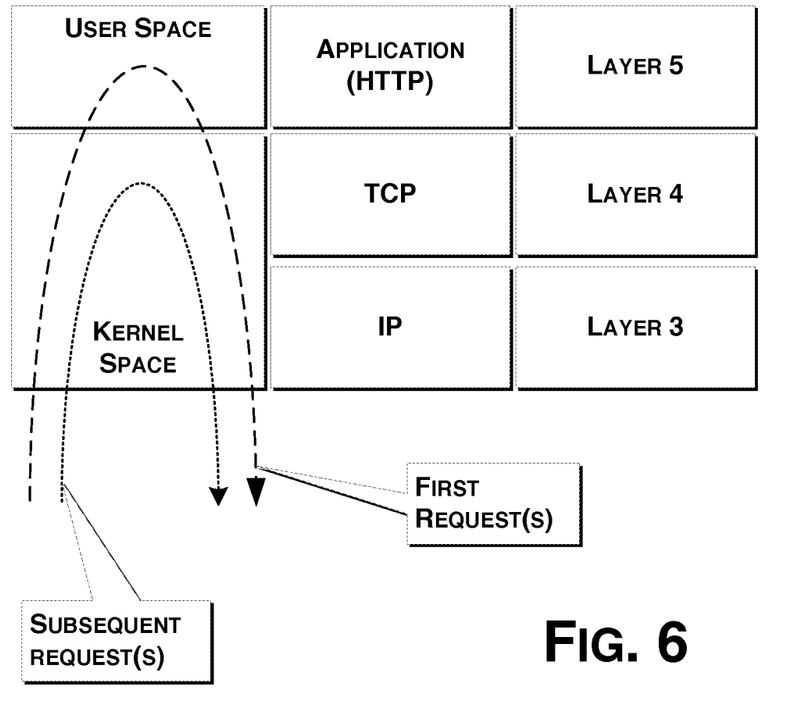
FIGS. 6-7 show aspects of a process for cross-cluster Direct Server Return in a CDN according to exemplary embodiments hereof.

As shown in FIG. 6, the first request(s) to the IC from the client are handled by the IC at the application (HTTP) layer, whereas after the handoff to BS, subsequent requests are preferably handled by the IC at the TCP layer.

As will be appreciated, the introduction of the BS 106-B may introduce delays compared to a hypothetical direct TCP/IP connection between BS and the client. There may, e.g., be a delay added by the extra time T1 from the client to IC and T2 from IC to BS. The DSR migration to BS may potentially impact the performance of the overall throughput of the session because the path (for the TCP round trip time) is potentially being lengthened. There is also a delay in serving the initial response from BS as opposed to serving the response directly from IC. The handoff has potential for making some aspects of the response to the client worse than if the response had been served directly from IC. These potential delays, etc. can be taken into account when selecting BS.

Thus, as shown in FIG. 4, once responsibility for the request has been transferred from the IC 106-A to the better server, BS 106-B, the IC passes TCP packets from the client 208 to the better server, BS 106-B. These packets are transferred at the TCP (layer 4) level, and the IC 106-A need not examine them. The better server, BS 106-B, obtains the TCP packets from the client (via the IC 106-A) and processes the client request. From the client's perspective it has a TCP connection with the IC 106-A.

Preferably the chosen better server (BS) (or the chosen better cluster) handles the request and does not, itself, pass on the request to yet another "better" server. While such processing is possible and contemplated herein, it is likely to introduce unacceptable delays.

As noted herein, IC 106-A may, in some cases, be capable of serving the requested content and may sometimes serve requested content to a client. Those of ordinary skill in the art will realize and appreciate, upon reading this description, that embodiments of the system are preferably symmetric, in that the "better" server (BS) may, itself, be an initial contact for some client requests and may include the same DSR migration capabilities as IC. Similarly, IC may be a "better"

server for some other initial contact and may have a client connection DSR migrated to it.

Migration Decision and Picking a "Better" Server

There are effectively two determinations being made with respect to DSR migration of a client request, namely (1) that the IC server is not the "best" server to handle a particular client request; and (2) that BS is a better choice. The first determination is, effectively, a decision as to whether or not to migrate the request to another server (see 504 in FIG. 5). The choice of the other ("better") server (see 508 in FIG. 5) may be made in conjunction with the first determination or as a separate determination.

In presently preferred exemplary embodiment the IC decides whether to make the migration (e.g., whether it is the "best" server to handle a particular client request), and/or determines (or causes a determination of) a "better" server to handle that particular request.

The IC may make these determinations based on information associated with the request, at least some of which is information that was not known to the rendezvous system 112 at the time that IC was selected by the rendezvous system. This information may include one or more of:
(1) the requesting client's network (IP) address;
(2) customer information (e.g., the CDN customer with which the requested content is associated, e.g., based on property information);
(3) size of the requested content;
(4) kind of the requested content;
(5) serving policy associated with the requested content (e.g., based on property information);
(6) media player need or used for the requested content;
(7) type of client's device; and
(8) load at the IC.

Cases for DSR cross-cluster migration include the following cases (alone or in combination):
1. Poor Rendezvous, congested links, and re-migration
2. Overloaded Server
3. Cross-rack/cluster migration using mapping (hashing)

For some of the server selection approaches it is preferable to have an equivalent of the intra-cluster heartbeat process in order to know which machines are online. This may be implemented, at least in part, using the super-HB described above. As noted above, a heartbeat (e.g., a cross-cluster heartbeat) may be implemented, e.g., using the reducer/collector systems such as described in U.S. Pat. No. 8,825,830.

Bad Rendezvous, Congested Links, and Re-Migration

In this case the rendezvous system 112 may have picked the IC based on stale and/or insufficient information. The IC may use information associated with the actual client request to inform a better selection (e.g., the better server (BS) in a different cluster) and performs DSR migration to that better server. The selection may be made using some or all information associated with the actual request (as described above). The IC may use information that was not known or available to the rendezvous system 112 (e.g., the requesting client's network (IP) address and/or other information listed above). Another reason to move traffic may be that the link between the selected server and the client is found to be congested, and so an alternate BS may be selected which will cause return traffic to cross a less congested link.

In some cases the IC may determine (at 504 in FIG. 5) whether or not to migrate the request by determining whether or not it is the wrong server to handle the client request. Once it has positively made this determination, it can then use the rendezvous system 112 to pick a "better" server (preferably using information determined from the client request).

The IC may use geographical information (e.g., from an IP-geo-location database) to make this determination. For example, if the IC determines that it is geographically far (e.g., over 100 miles) from the client, then it may assume that it is the wrong server to handle the request. As should be appreciated, the IC may have, in fact, not been the wrong server to handle the client request. For example, a client in Japan may be directed to an IC server in Los Angeles, USA because the requested content is only servable from the USA. Thus, the geographic information may be insufficient for such a determination.

In some cases, e.g., based on geographic distance from the client to the IC, the IC may invoke the rendezvous system 112 (e.g., using information determined from the client request) and then rely on the decision by the rendezvous system 112 to serve the client. However, if the server chosen by the rendezvous system 112 is also geographically far from the IC, the delay caused by the cross-cluster migration may be sufficiently bad to make a direct connection between the client and the selected "better" server preferable (had such a connection been possible). For example, a client in Japan may be directed to an IC server in Los Angeles, USA. The IC invokes the rendezvous system 112 which picks a "better" server in Japan. In this case, the DSR from the IC to the "better" server in Japan may be much worse than had the IC served the content to the client. This will depend on the delay getting the ACKs back from the client to the "better" server via the IC.

If the server chosen by the rendezvous system 112 is not geographically far from the IC, then the IC may decide that it will handle the request anyway. For example, the IC is in Los Angeles, USA, and the client is in Japan. If the rendezvous system 112 returns a "better" server also in Los Angeles, then the IC may handle the request anyway, without migration (the IC is essentially deciding that it is good enough to handle this request). Similarly, if the rendezvous system 112 returns a "better" server in San Francisco, then the IC may handle the request anyway, without migration. But if the rendezvous system 112 returns a "better" server in Japan, then the IC may initiate the DSR migration to that Japanese server.

Overloaded Server and Re-Migration

This approach deals with the problems associated with so-called flash crowds, e.g., around live events (e.g., sports, concerts, and the like). In these cases a large number of clients all want to start playing a video stream at the same time.

A DNS-based rendezvous system 112 does not always deal well with flash crowds. The rendezvous system 112 maps (or resolves) hostnames in requests to IP addresses. One approach to dealing with potential flash crowds is to associate a lot of IP addresses with hostnames that might attract flash crowds. However, if lots of IP addresses are associated with particular content (e.g., in anticipation of a flash crowd), then when there is no crowd (e.g., no high demand) requests are being unnecessarily sent to many IP addresses (and thus to many machines). Since multiple machines are essentially processing the same request for the same content, there are inefficiencies in spreading the requests when there is not a heavy load or demand for that content.

In order to deal with flash crowds, the rendezvous system 112 may be configured to send requests to a few servers (i.e., with a corresponding few IP addresses), and each server (essentially an initial contact or IC) can handle some percentage or ratio of requests and migrate some out. For example, if an IC determines that the number of requests exceeds a threshold (T), preferably predefined, for a particular content, then the IC can use DSR migration to migrate out some ratio or percentage of requests above that threshold T. The ratio may be 100% (i.e., all requests above the threshold) or less than all (e.g., 2/3, 4/5, etc.).

Figure 7:
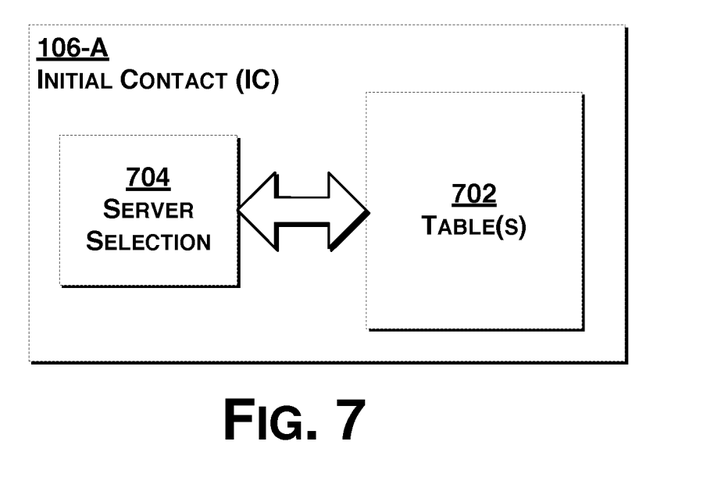

In some cases the IC may resolve a hostname associated with the client request to get a list of IP addresses (a so-called "fallback" list) that could handle the request. These IP addresses may be stored in a table (e.g., table 702 in FIG. 7) and selected by the IC (using server selection mechanism 704 in FIG. 7) when the IC needs to migrate to another ("better") server. The server selection mechanism 704 may randomly select an address from the table 702, preferably taking the super heartbeat and prior selections into account.

Instead of (or as well as this fallback list), the IC may re-invoke the rendezvous system for at least some requests, using information known to the IC that was not previously available to the rendezvous system (e.g., the client's IP address, etc.). In these cases the IC is effectively invoking the CDN's rendezvous system to pick the "better" server, but using information associated with the client request to the IC.

Additionally (or instead), an IC may cache or store some of the rendezvous system's server selection information (with an appropriate time-to-live—TTL) in order to avoid some future name resolution (in favor of table lookups). The TTL for such information needs to be short enough to prevent the IC from picking a "better" server that cannot actually handle a request in a better manner. The IC need not store all of the rendezvous system's information (tables), and can store selected information appropriate for localized migration. For example, even if the rendezvous system stores information about 100,000 servers, the IC may only need (and therefore only store) information about 1,000 of those servers. The servers for which an IC may store rendezvous system information may be, e.g., servers that are responsible for the same properties.

As should be appreciated, having the ICs select the "better" server (e.g., with localized rendezvous system tables (e.g., about server load, connectivity, and the like), effectively makes those ICs localized (and potentially coarse grained) rendezvous mechanisms.

Cross-Rack/Cluster Migration Using Mapping (Hashing)

For this approach, the IC maps (e.g., hashes) the request (at the application level—e.g., the HTTP level) to a number in a particular range. Each number corresponds to a server that can process the request (including, perhaps, the IC). Notably, the number may correspond to a server in a different cluster (e.g., BS in Cluster B in FIG. 4), in which case the IC performs the cross-cluster DSR migration as described above. With reference to the flowchart in FIG. 5, the hashing of the request effectively combines acts 504 and 508, in that the result of the hash effectively picks the server BS (which may not be IC). Note that in some implementations IC may be a candidate server and some hashes of the request may result in the IC being chosen to handle the request.

The mapping or hash function may implement a responsibility function, so that the result of the mapping or hash function on the request designates the responsible server for the request. Notably, the mapping or hash function may map to servers in at least one other cluster.

This approach is optimal for a very large library of very large resources.

The selected machine (based on the hash of the request) may reject the migration, in which case it may, itself, try to pick another server. Alternately, the selected machine may tell the IC to select another server or to handle the request itself. As should be appreciated, while possible, it is undesirable to create a chain of multiple machines processing the request (where, e.g., the BS picks yet another BS-2, and so on).

As noted above, the DSR migration is transparent to the client, and so the client must see the requested content coming from the same address as the IC (which is where the client thinks it is coming from). To this end, the BS must spoof the IP address of the IC on a per connection basis unless the BS has the same IP address as the IC, e.g., in an anycast system in which all potential ICs and BSs have the same IP address.

Those of ordinary skill in the art will realize and appreciate, upon reading this description, that the ICs and BSs should be in the same autonomous system (AS) in order for the DSR migration to function, otherwise source-filter routing may filter out packets.

In some cases, the IC may be dedicated appliances that do not serve content and essentially act as a second level HTTP-level DNS mechanism.

Computing

The services, mechanisms, operations and acts shown and described above are implemented, at least in part, by software running on one or more computers of a CDN.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 8:
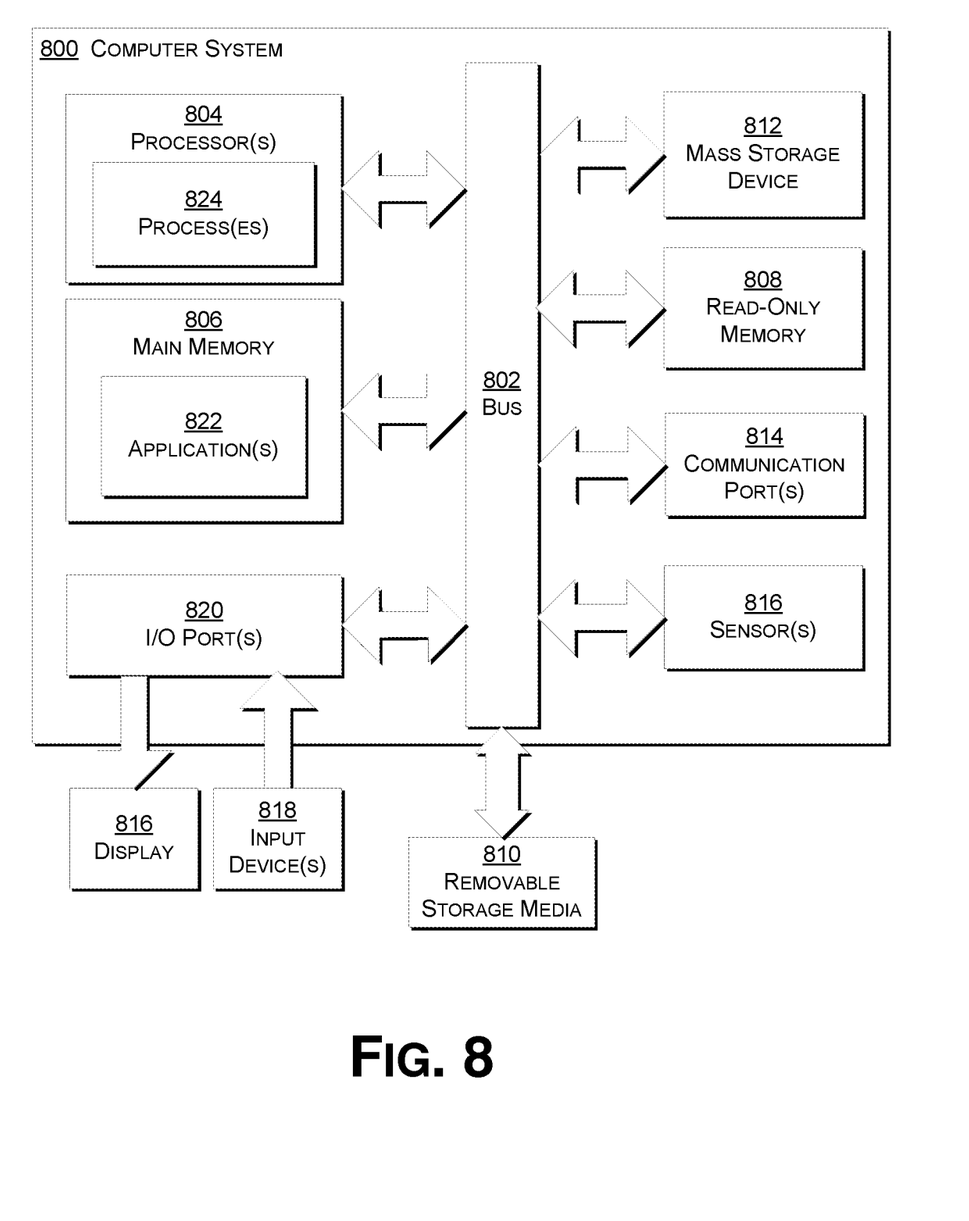
FIG. 8 depicts aspects of computing according to exemplary embodiments hereof.

FIG. 8 is a schematic diagram of a computer system 800 upon which embodiments of the present disclosure may be implemented and carried out.

According to the present example, the computer system 800 includes a bus 802 (i.e., interconnect), one or more processors 804, a main memory 806, read-only memory 808, removable storage media 810, mass storage 812, and one or more communications ports 814. Communication port 814 may be connected to one or more networks by way of which the computer system 800 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 804 can be any known processor, such as, but not limited to, an Intel® Itanium® or Itanium 2® processor(s), AMD® Opteron® or Athlon MP® processor(s), or Motorola® lines of processors, and the like. Communications port(s) 814 can be any of an RS-232 port for use with a modem based dial-up connection, a 10/100 Ethernet port, a Gigabit port using copper or fiber, or a USB port, and the like. Communications port(s) 814 may be chosen depending on a network such as a Local Area Network (LAN), a Wide Area Network (WAN), a CDN, or any network to which the computer system 800 connects. The computer system 800 may be in communication with peripheral devices (e.g., display screen 816, input device(s) 818) via Input/Output (I/O) port 820.

Main memory 806 can be Random Access Memory (RAM), or any other dynamic storage device(s) commonly known in the art. Read-only memory 808 can be any static storage device(s) such as Programmable Read-Only Memory (PROM) chips for storing static information such as instructions for processor 804. Mass storage 812 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 802 communicatively couples processor(s) 804 with the other memory, storage, and communications blocks. Bus 802 can be a PCI/PCI-X, SCSI, a Universal Serial Bus (USB) based system bus (or other) depending on the storage devices used, and the like. Removable storage media 810 can be any kind of external hard-drives, floppy drives, IOMEGA® Zip Drives, Compact Disc-Read Only Memory (CD-ROM), Compact Disc-Re-Writable (CD-RW), Digital Versatile Disk—Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 806 is encoded with application(s) 822 that supports the functionality discussed herein (the application 822 may be an application that provides some or all of the functionality of the CD services described herein, including the client application and the optimization support mechanism 112). Application(s) 822 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 804 accesses main memory 806 via the use of bus 802 in order to launch, run, execute, interpret or otherwise perform the logic instructions of the application(s) 822. Execution of application(s) 822 produces processing functionality of the service related to the application(s). In other words, the process(es) 824 represent one or more portions of the application(s) 822 performing within or upon the processor(s) 804 in the computer system 800.

It should be noted that, in addition to the process(es) 824 that carries (carry) out operations as discussed herein, other embodiments herein include the application 822 itself (i.e., the un-executed or non-performing logic instructions and/or data). The application 822 may be stored on a computer readable medium (e.g., a repository) such as a disk or in an optical medium. According to other embodiments, the application 822 can also be stored in a memory type system such as in firmware, read only memory (ROM), or, as in this example, as executable code within the main memory 806 (e.g., within Random Access Memory or RAM). For example, application 822 may also be stored in removable storage media 810, read-only memory 808 and/or mass storage device 812.

Those skilled in the art will understand that the computer system 800 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some services" means "one or more services", and includes the case of one service.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of CDN services" may include one or more CDN services.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram, the activities associated with those boxes may be performed in any order, including fully or partially in parallel.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

We claim:

1. A particular server in a content delivery network (CDN), wherein said CDN delivers content on behalf of at least one content provider, said particular server implementing a content delivery (CD) service, said particular server:

(A) receiving a request from a client device for particular content on a particular client connection;

applying a hash function that maps to servers in the second cluster and implements a responsibility function, wherein the responsibility function results in a designation of a second server as a responsible server to handle said request;

(B) determining the second server in said CDN is suited to handle said request based on a proximity to the client device by a measure of network cost before migrating said request to the second server, wherein said particular server being in a first cluster and said second server being in a second cluster distinct from said first cluster, wherein the second server is determined to be suited to handle said request without having the particular content at a first time of the request, and wherein the second server serves the particular content at a second time, and wherein said first server is converted to a routing device for said particular client connection;

(C) migrating said request to said second server; and then (D) providing said second server with network traffic associated with said request from said client device, said second server spoofing an identification of said particular server, said second server to deliver said particular content to said client device;

(E) receiving, by said particular server, from said client device an acknowledgment, wherein said acknowledgment is in response to said particular content being delivered from said second server to said client device; and (F) sending, by said particular server, said received acknowledgment to said second server.

2. A content delivery network (CDN) wherein said CDN delivers content on behalf of at least one content provider, said CDN comprising:

one or more servers, including at least a first server implementing a content delivery (CD) service, said first server:

(A) receiving a request from a client device for particular content on a particular client connection;

applying a hash function that maps to servers in the second cluster and implements a responsibility function, wherein the responsibility function results in a designation of a second server as a responsible server to handle said request;

(B) determining the second server in said CDN is suited to handle said request based on a proximity to the client device by a measure of network cost before migrating said request to the second server, wherein said first server being in a first cluster and said second server being in a second cluster distinct from said first cluster, wherein the second server is determined to be suited to handle said request without having the particular content at a first time of the request, and wherein the second server serves the particular content at a second time, and wherein said first server is converted to a routing device for said particular client connection;

(C) migrating said request to said second server; and then (D) providing said second server with network traffic associated with said request from said client device, said second server spoofing an identification of said first server, said second server to deliver said particular content to said client device;

(E) receiving, by said first server, from said client device an acknowledgment, wherein said acknowledgment is in response to said particular content being delivered from said second server to said client device; and (F) sending, by said first server, said acknowledgment to said second server.

* * * * *